United States Patent

[11] 3,576,267

[72] Inventors Nonnie J. Blevins;
 Eugene I. Wheeler; Gilbert M. Cox,
 Carrollton, Mo.
[21] Appl. No. 807,012
[22] Filed Mar. 13, 1969
[45] Patented Apr. 27, 1971
[73] Assignee Said Blevins assignor to said Wheeler

[54] TRANSPORT CART
 7 Claims, 6 Drawing Figs.
[52] U.S. Cl................................................ 214/130,
 214/86
[51] Int. Cl......................................................... B66c 23/00
[50] Field of Search........................................... 214/132,
 77, 78, 79, 80, 151; 172/463, 240, 316, 491;
 214/130

[56] References Cited
UNITED STATES PATENTS
2,786,589  3/1957  Garrett......................... 214/130

Primary Examiner—Gerald M. Forlenza
Assistant Examiner—Lawrence J. Oresky
Attorney—Schmidt, Johnson, Hovey, Williams & Chase ABSTRACT: A wheeled transport cart including a system of standards and levers rigidly mounted upon a plate for swinging movement about the axle of the cart in combination with power means for lifting and carrying a transportable object. Means are provided on the chassis of the cart for hitching to a towing vehicle and for rotation of the plate to permit movement of relatively long objects over the road and within confined spaces.

PATENTED APR 27 1971 3,576,267
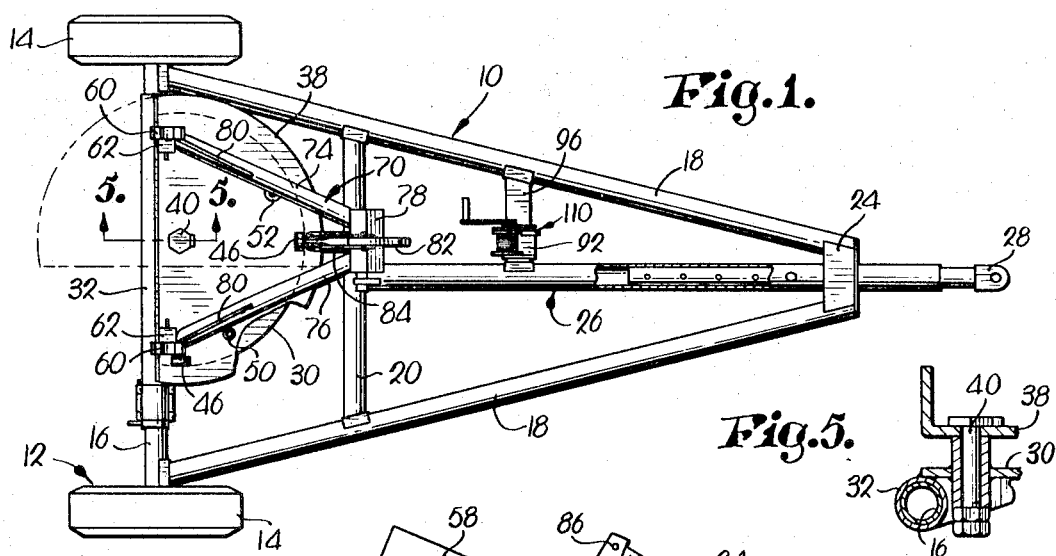
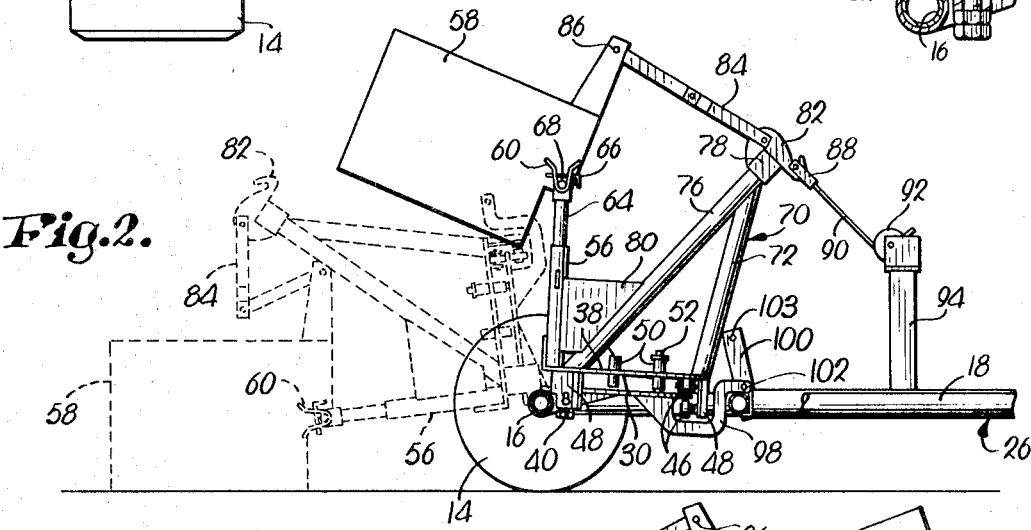
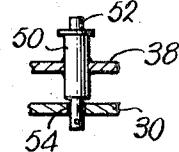
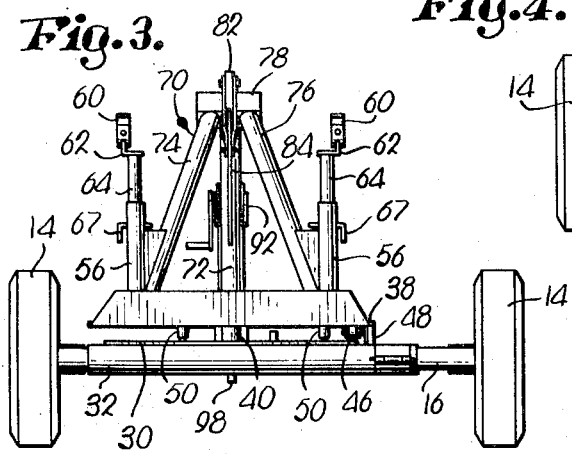
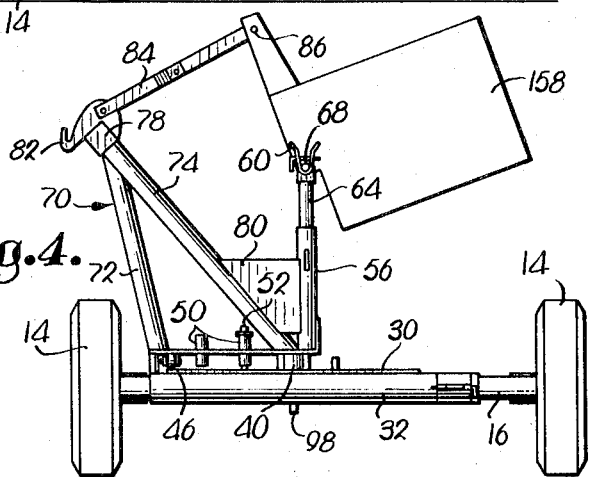
INVENTORS.
Nonnie J. Blevins
Eugene I. Wheeler
Gilbert M. Cox
BY Schmidt, Johnson, Hovey,
Williams & Chase
ATTORNEYS.

TRANSPORT CART

This invention relates to a towable, wheeled chassis for lifting and carrying farm implements and other objects.

It is often necessary in the operation of a farm wherein fields are frequently separated by substantial distances and a network of roads to transport an implement from field to field for subsequent use behind a tractor or the like in each field. Towing behind a tractor for these distances is a slow and sometimes dangerous way of delivering the implement to the field to be worked, in view of the relative speed of the tractor and the fact that heavily traveled roads are often encountered.

It is, therefore, an important object of the instant invention to provide a transport device which lifts from the ground the implement to be transferred and supports it on the framework of the device in a safe and secure manner, and which is adapted for hitching to a pickup truck or other vehicle for rapid transfer of the implement to another area.

It is another important object of this invention to provide in combination with a winch, piston and cylinder assembly, or other power means secured to the frame of the transport device a system of standards and levers rigidly mounted to a plate which is swingable about the axle of the transport device for loading and unloading of the implement to be transferred.

It is a further important object of this invention to provide coupling means affixed to the standard and lever members which are designed and spaced for connection with a "three-point" hitch commonly found on farm implements, while gaining full mechanical advantage through the members during raising and lowering of the implement for transporting.

It is yet another important object of the instant invention to provide means for rotating the system of standards and levers mounted on the plate and thus the farm implement about an axis perpendicular to the plate in order to position the implement with its longitudinal axis parallel to the path of travel of the transport cart for easy movement through narrow farm gates and the like.

In the drawings:

FIG. 1 is a top plan view of the transport cart of our present invention showing the loading apparatus in a raised position;

FIG. 2 is a fragmentary, side elevational view of the cart with the loading apparatus shown supporting a load in a raised position with the right wheel omitted for clarity, the dotted lines representing the same in a lowered position for pickup;

FIG. 3 is a rear elevational view of the transport cart with the loading apparatus in a raised position;

FIG. 4 is a rear elevational view of the transport cart showing the loading apparatus and the supported load rotated 90° from the position shown in FIG. 2;

FIG. 5 is an enlarged, cross-sectional view taken along line 5—5 of FIG. 1; and

FIG. 6 is an enlarged, cross-sectional, fragmentary view showing the locking pin assembly used to hold the loading apparatus against rotation.

A chassis 10 is supported at one end by a wheel and axle assembly 12 comprising a pair of ground engaging wheels 14 and a longitudinal axle 16 extending between wheels 14. The chassis 10 is generally an A-frame comprised of forwardly converging side members 18 rigidly affixed to axle 16 and joined by a crossmember 20. The forward ends of members 18 are joined to transversely extending flange 24, there being an extensible hitching assembly 26 projecting forwardly from crossmember 20 between members 18 under flange 24, and provided with connecting means 28 at the outer end thereof for hookup with a towing vehicle.

A semicircular base 30 is secured, as shown in FIG. 5, rigidly to a tube 32 that is in turn rotatable on the axle 16.

A semicircular plate 38 of slightly larger radius than base 30 is rotatably mounted on base 30 in overlying relation thereto by a trunnion 40. Plate 38 is supported by two sets of coordinating rollers 46, the uppermost roller in each set being mounted to the underside of plate 38, and the lower roller in each set being mounted to projections 48 extending downwardly from plate 38, thereby disposing rollers 46 for circumferential travel on the upper and lower surfaces of base 30 respectively as plate 38 is rotated.

Plate 38 has means for locking it against rotation relative to base 30 when in either of the positions shown by FIGS. 3 and 4, said means including sleeves 50 securely mounted through plate 38 as shown in FIG. 6, shoulder pin 52 slidably engaged therein, and holes 54 in base 30 for receiving the lowermost end of shoulder pin 52 as it projects through one of the sleeves 50.

A pair of extensible standards 56 rigidly mounted to plate 38 and projecting outwardly therefrom are provided with means at their outer ends for connection with an object 58 such as an implement to be transported, said means including U-shaped couplers 60 so mounted that their line of centers is normally parallel to axle 16, L-plates 62 affixing couplers 60 to the extensible members 64 of standards 56, and L-pins 66 extending transversely through couplers 60 as shown in FIG. 2 for containing outer points 68 of the above-mentioned "three-point" hitch on implement 58.

Couplers 60 can accept narrower loads than implement 58 by removing pins 67 and rotating members 64 180° from their positions as shown in FIG. 3. The load carried by standards 56 need not be limited to a farm implement so long as means are provided on the load for connection with couplers 60.

A tripodal lever unit 70 has each leg 72, 74 and 76 thereof rigidly secured to plate 38 remote from each other at their bases, and extending outwardly therefrom at such angles from plate 38 to converge at their outer ends in box 78, legs 74 and 76 being additionally supported by gussets 80 connecting them with standards 56.

A hook 82 is mounted on box 78 and has linkage 84 pivotally attached thereto for connecting with the center point 86 of the above-mentioned "three-point" hitch on implement 58. Linkage 84 has a joint intermediate its ends adapted to buckle when plate 38 is in the dashed line position of FIG. 2. The hook 82 receives a clevis 88 on a cable 90 of winch 92 to control swinging movement of lever unit 70, standards 56, plate 38, and base 30 as they move as one unit about axle 16 during raising or lowering of implement 58 for transport. The winch 92 is supported by an upright 94 secured to bar 96 on chassis 10.

The loading apparatus is locked in the raised position by locking arm 98 attached to base 30 and extending between a pair of bars 100 (one only being shown in FIG. 2) secured to crossmember 20. Holes are provided in arm 98 and bars 100 for receiving a locking pin 102.

It is to be noted at this juncture that through use of pin 102, it is not necessary to rely entirely upon winch 92 to support the load, notwithstanding the fact that winch 92 is provided with the usual ratchet-pawl mechanism 110 for maintaining the cable 90 taut. Whether or not the tongue assembly 26 is extended depends upon the nature of the confined areas within which the load 58 is transported, as for example within a display lot or inventory storage building, as distinguished from over-the-road or field transport.

In the event an implement or other load 158 is relatively long and would extend laterally beyond the wheels 14 in an objectional manner, it is possible to reposition it as shown in FIG. 4. After inserting pin 102 clevis 88 may be removed from hook 82 and thereupon pin 52 is removed. This permits manual rotation of the plate 38 about trunnion 40 with respect to base 30 whereupon pin 52 is inserted in the second hole 54, the holes 54 being circumferentially spaced 90° as shown in FIG. 1.

In certain types of implements and other transportable objects it may be necessary or desirable to only raise a portion thereof so as to place it in tow behind the wheels 14, rather than to elevate the load to the positions of FIGS. 2 or 4. In that event winch 92 swings the plate 38 only to an inclined position where pin 102 of arm 98 will pass through holes 103 in bars 100.

Another type of load other than implements, for example, may comprise large drums or reels of wire or the like. In that event a shaft or rod comparable to pins 68 may be passed through the hub of the reel and then placed in the saddlelike couplers 60 for retention by pins 66 prior to elevation through use of winch 92.

We claim:

1. A transport cart comprising:
a towable vehicle having a chassis and a wheel and axle assembly supporting the chassis;
a plate normally overlying said chassis;
structure mounting said plate on the axle of said assembly for swinging movement about the longitudinal axis of said axle to and from an upright loading position;
a standard rigidly secured to said plate for swinging movement therewith and extending upwardly therefrom when the plate overlies the chassis;
coupling means on said standard remote from the plate for attaching the standard to a transportable object when the plate is in said position;
a lever unit rigidly secured to said plate for swinging movement therewith and provided with a terminus spaced from the plate and from said coupling means;
power means interconnecting the chassis and said terminus for swinging the plate from said position into overlying relationship to the chassis to raise an object attached to the coupling means; and
a connector secured to the unit at said terminus for attaching the unit to said object,
said connector including linkage pivotally secured to the unit and having a joint therein adapted to buckle when the plate is in said position.

2. A transport cart comprising:
a towable vehicle having a chassis and a wheel and axle assembly supporting the chassis;
a plate normally overlying said chassis;
structure mounting said plate on the axle of said assembly for swinging movement about the longitudinal axis of said axle to and from an upright loading position,
said structure including a tube rotatable on said axle, a base rigid to the tube for rotation therewith, and a trunnion attaching the plate 38 to the base 30 for rotation about an axis intersecting the path of swinging movement of the plate and the base;
a standard rigidly secured to said plate for swinging movement therewith and extending upwardly therefrom when the plate overlies the chassis;
coupling means on said standard remote from the plate for attaching the standard to a transportable object when the plate is in said position;
a lever unit rigidly secured to said plate for swinging movement therewith and provided with a terminus spaced from the plate and from said coupling means; and
power means interconnecting the chassis and said terminus for swinging the plate from said position into overlying relationship to the chassis to raise an object attached to the coupling means.

3. The invention of claim 2; and releasable fastener means between the base and the plate for holding the latter in any one of a number of positions relative to the base.

4. The invention of claim 2; and releasable locking mechanism for attaching the base to the chassis whereby to hold the base against rotation about the axle.

5. The invention of claim 1, said structure including a tube rotatable on said axle, a base rigid to the tube for rotation wherewith, and a trunnion attaching the plate to the base for rotation about an axis intersecting the path of swinging movement of the plate and the base.

6. The invention of claim 5; and releasable fastener means between the base and the plate for holding the latter in any one of a number of positions relative to the base.

7. The invention of claim 6; and releasable locking mechanism for attaching the base to the chassis whereby to hold the base against rotation about the axle.